(12) United States Patent
Thomas et al.

(10) Patent No.: US 8,374,179 B2
(45) Date of Patent: Feb. 12, 2013

(54) METHOD FOR MANAGING A COMMUNICATION GROUP OF COMMUNICATION DEVICES

(75) Inventors: Shanthi E. Thomas, Carpentersville, IL (US); Tyrone D. Bekiares, Chicago, IL (US); Matthew C. Keller, Algonquin, IL (US); Robert J. Milausnic, Chicago, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 511 days.

(21) Appl. No.: 11/690,587

(22) Filed: Mar. 23, 2007

(65) Prior Publication Data

US 2008/0232367 A1  Sep. 25, 2008

(51) Int. Cl.
*H04L 12/56* (2006.01)
(52) U.S. Cl. .................. 370/390; 370/337; 370/467
(58) Field of Classification Search .......... 370/337, 370/351, 467, 469, 352, 236; 725/74, 82, 725/134; 715/760; 455/416, 412.1
See application file for complete search history.

(56) References Cited

U.S. PATENT DOCUMENTS

| 6,269,080 | B1 * | 7/2001 | Kumar | 370/236 |
| 6,804,254 | B1 * | 10/2004 | Pearce et al. | 370/467 |
| 2004/0203677 | A1 * | 10/2004 | Brown et al. | 455/416 |
| 2005/0213559 | A1 * | 9/2005 | O'Neill et al. | 370/351 |
| 2006/0013169 | A2 * | 1/2006 | Boynton | 370/337 |
| 2007/0021137 | A1 * | 1/2007 | Kokkonen et al. | 455/518 |
| 2007/0036093 | A1 * | 2/2007 | Newberg et al. | 370/260 |
| 2007/0157281 | A1 * | 7/2007 | Ellis et al. | 725/134 |
| 2008/0229217 | A1 * | 9/2008 | Kembel et al. | 715/760 |

FOREIGN PATENT DOCUMENTS

WO  WO2006000865 A1  1/2006

OTHER PUBLICATIONS

Olli Rantapuk, et al. "Grassroots Group Communication Inside Peer-To-Peer Mobile Communities", The 17th Annual IEEE International Symposium on Personal, Indoor and Mobile Radio Communications (PIMRC'06), Sep. 2006, pp. 1-5.
English Translation of Chinese Office Action for counterpart Chinese Patent Application No. 200880009449.7 issued on Feb. 17, 2012.
International Search Report and Written Opinion mailed on Jul. 29, 2008 for counterpart International Application No. PCT/US2008/055988.
International Preliminary Report on Patentability mailed on Oct. 8, 2009 for counterpart International Application No. PCT/US2008/055988.

* cited by examiner

*Primary Examiner* — Dang Ton
*Assistant Examiner* — Mohamed Kamara
(74) *Attorney, Agent, or Firm* — Indira Saladi; Terri Hughes Smith; Daniel R. Bestor

(57) ABSTRACT

A first communication device managing a communication group of communication devices in a communication network is disclosed. The first communication device sends one or more data objects to the communication group and receives an affiliation request from a second communication device. The first communication device determines the one or more data objects that have not been received by a user of the second communication device and provides the data objects to the second communication device by establishing a communication session between the second communication device and the first communication device.

20 Claims, 2 Drawing Sheets

METHOD FOR MANAGING A COMMUNICATION GROUP OF COMMUNICATION DEVICES

The present invention generally relates to communication networks and particularly relates to managing a communication group of communication devices in a communication network.

BACKGROUND OF THE INVENTION

A communication network generally comprises a number of communication devices that communicate with each other either directly or via each other. In many cases, the communication devices may be grouped, e.g. into groups having common characteristics, so that a communication group enables communication among the communication devices in the group. For example, a communication group may enable a user of a communication device to share data objects (e.g. audio, video, and text) with another communication device or devices in the communication group. In such a case, a single message may be addressed to the communication group and received by all the communication devices in the group. Instead of having to address each communication device with separate messages, a single message facilitates efficient communication within the communication devices in the group.

A problem with this approach is where a communication device in the communication group does not receive a message (e.g. due to poor network coverage or because the communication device is not currently connected to the communication network) when it is first sent by one of the communication devices. If a communication device does not receive the message when the message is first sent, then the communication device misses out on the communication. One possible solution to ensuring that the communication device receives the sent message is to re-send the communication until the communication device receives the message.

Another problem with this approach is that a communication device that joins a communication group after the message is sent (also called a "late entrant") misses out on receiving the message. Thus, only communication devices that are already part of the communication group when the message is sent receive the message. Even if there were a way to ensure that late entrants to a group receive the message, there is no surety that the message is delivered to a user of the communication device that joined the group after the message was sent. Currently, there is no solution to ensuring that late entrants receive previously sent messages.

Accordingly, there is a need for a method for managing a communication group of communication devices.

BRIEF DESCRIPTION OF THE FIGURES

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

Skilled artisans will appreciate that elements in the figures are illustrated for simplicity and clarity and have not necessarily been drawn to scale. For example, the dimensions of some of the elements in the figures may be exaggerated, relative to other elements, to help in improving an understanding of the embodiments of the present invention.

DETAILED DESCRIPTION

Before describing in detail the particular method for managing a communication group of communication devices, in accordance with various embodiments of the present invention, it should be observed that the present invention resides primarily in combinations of method steps related to a method for managing a communication group of communication devices.

In this document, the terms "comprises," "comprising", or any other variation thereof, are intended to cover a non-exclusive inclusion, such that a process, method, article or apparatus that comprises a list of elements does not include only those elements, but may include other elements that are not expressly listed or inherent in such a process, method, article or apparatus. An element proceeded by "comprises . . . a" does not, without more constraints, preclude the existence of additional identical elements in the process, method, article or apparatus that comprises the element. The term "another," as used in this document, is defined as at least a second or more. The terms "includes" and/or "having", as used herein, are defined as comprising.

Figure 1:
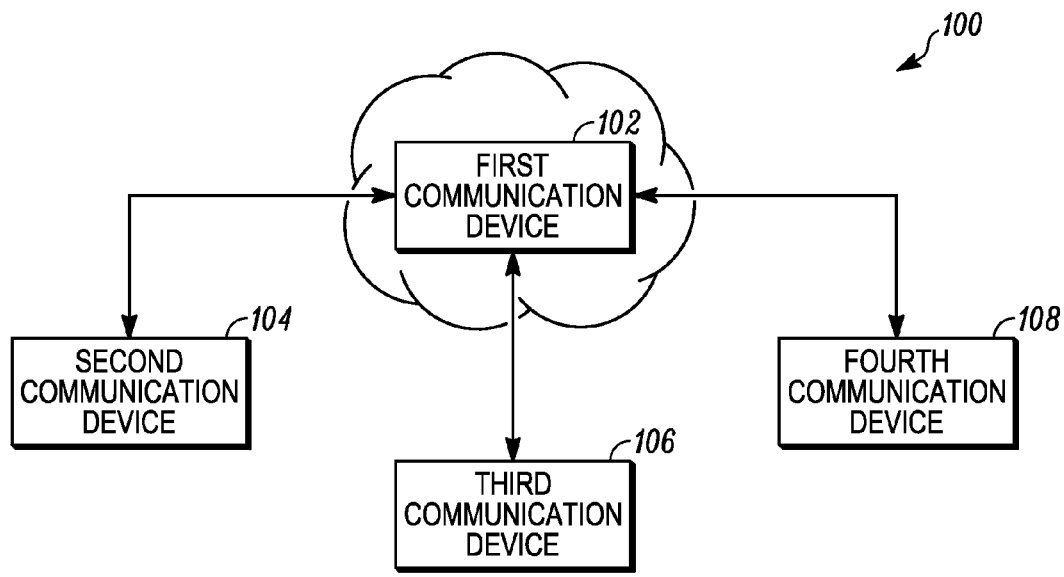
FIG. 1 is a block diagram of a communication network where various embodiments of the present invention can be practiced.

FIG. 1 illustrates a communication network 100, where various embodiments of the present invention can be practiced. The communication network 100 may be geographically spread over an area, such as a building, a campus, a city, and so forth. Examples of the communication network 100 include a Local Area Network (LAN), a Metropolitan Area Network (MAN), a Wide Area Network (WAN) such as the Internet, and the like. In any case, the communication network 100 can be a client-server network or a peer-to-peer network.

Regardless of the type, the communication network 100 includes a plurality of communication devices. For example, the communication network 100 is shown to include a first communication device 102, a second communication device 104, a third communication device 106, and a fourth communication device 108. Examples of the communication devices 102 to 108 include, but are not limited to, computers, laptops, personal digital assistants (PDAs), and mobile phones. Further, each of the communication devices can be a wireless base station, a Radio Frequency (RF) base station or a server.

At least some of the communication devices in the plurality of communication devices in the communication network 100 form a communication group. For example, communication devices 102 and 104 may form a communication group and communication devices 104, 106, and 108 may form another communication group. As used herein, a communication group is a group of communication devices that share common characteristics. Examples of common characteristics include a common functional responsibility, a geographical area, and a working shift. Another example of a common characteristic is that a system operator of the communication network 100 sets up a communication group with certain communication devices and such a communication group is defined by the system operator. For example, communication devices 104, 106, and 108 may be defined by a system operator because the communication devices are all used by fire fighters. Another example, the communication devices may form a communication group if the communication devices are all used to support police personnel on the west side of Chicago.

Regardless of how the communication group is defined, the communication group enables sharing of data objects among the communication devices associated with the group. Specifically, each communication device associated with the communication group is capable of sending data objects to other communication devices associated with the group. In one example, the data objects may be audio, video, and/or text information. For example, communication device 104 may wish to share a public safety audio message with communication devices in a public safety group (e.g. communication devices 106 and 108).

In an embodiment, one of the communication devices in the communication network 100 may be capable of managing a communication group of communication devices. In such an embodiment, the communication device managing the other communication devices in the group is termed a "server." For example, if communication device 102 is the server, then the communication device 104, the communication device 106 and the communication device 108 form a communication group and are associated with the server, namely communication device 102. Typically, any communication device of the communication group can act as a server to manage a communication group. This is particularly true where the communication network 100 is a peer-to-peer network, where each communication device in the communication network has equal weight with another communication device in the communication network.

As the server, the communication device 102 manages a communication group. The server's responsibility is to receive a data object from a communication device in the group and send the data object to the other communication devices in the group. For example, if communication device 106 wants to send a data object to a communication group that it is associated with, communication device 106 sends the data object to communication device 102 for communication device 102 to send to the other communication devices of the communication group.

Figure 2:
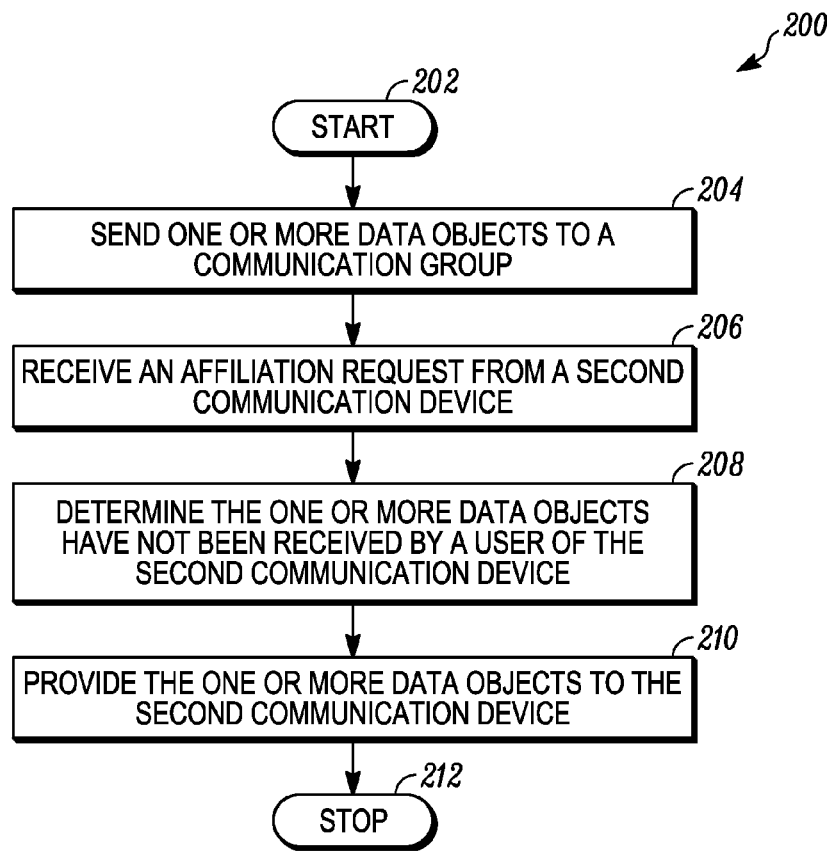
FIG. 2 is a flow diagram illustrating a method for managing a communication group of communication devices in a communication network, in accordance with a first embodiment.

FIG. 2 is a flow diagram illustrating a method 200 for managing a communication group of communication devices in the communication network 100, in accordance with an embodiment. To describe the method 200, reference has been made to FIG. 1, although it should be understood that the method 200 can be implemented in any other suitable environment or network. Moreover, the invention is not limited to the order in which the steps are listed in the method 200.

In one embodiment, the communication devices 104, 106 and 108 form a communication group and communication device 102 functions as a server. Initially, the communication device 104 is not affiliated with the communication group when the communication device 106 sends a data object, e.g. a joint photographic experts group (JPEG) image, to the communication group via the communication device 102. Since the communication device 104 is not affiliated with the communication group at the time that the communication device 106 sends the data object, communication device 104 will not receive the data object, namely the JPEG image. At step 202, the method 200 for managing a communication group is initiated. At step 204, the communication device 102 sends one or more data objects to the communication group (e.g. the data object sent by communication device 106 to the communication group), which includes the communication devices 106 and 108. In one example, a communication device receiving the sent one or more data objects (e.g. communication device 108) stores the data objects for a first predefined time interval, e.g. in a memory of the communication device 108. In such an example, the first predefined time interval can be determined by the communication device 108. In another embodiment, the predefined time interval is determined by the communication device that has sent the data object (e.g. communication device 102 or communication device 106). In any case, the data object may not be available to a future user of the communication device 108, if the future user logs in after the predefined time interval.

At step 206, the communication device 102 receives an affiliation request from the communication device 104, to join the communication group. In an embodiment, the affiliation request is a Session Initiation Protocol (SIP) Affiliate message, as is commonly known in the art. As is known to one of ordinary skill in the art, other such messages may be used for the affiliation request. As such, the mention of a SIP Affiliate message is only an example. In any case, once the affiliation request is received by communication device 102, communication device 104 becomes affiliated to the communication group. In one embodiment, communication device 102 sends an acknowledgement message of the affiliation to the communication group to communication device 104.

At step 208, the communication device 102 determines that the data objects have not been received by a user of the communication device 104. In one example, determining that the data objects have not been received requires maintaining a list of data objects, e.g. identifying that an acknowledgement of the sent data object has or has not been received by the communication device 104. For example, where the communication device 104 is shared by multiple users, such as a first user working a morning shift and a second user working a night shift, both the users use the communication device 104 and are associated with a communication group. In this case, when a data object is sent to the communication group during the morning shift, only the first user receives it. The second user, who comes in during the night shift is logged off during the morning shift, and therefore does not receive the data object. In such an example, an acknowledgement of the first user receiving the data object is sent to inform the server that the user received the data object. Once an acknowledgement is received, communication device 102 updates its list identifying that an acknowledgement of the sent data object has been received. Conversely, communication device 102 maintains the list to note that the second user has not received the sent data object.

At step 210, communication device 102 sends the data objects to the user of communication device 104 by establishing a communication session between communication device 104 and communication device 102. In an embodiment, the communication session is a point-to-point session, e.g. a SIP-based session. As is known to one of ordinary skill in the art, the communication session may adhere to other types of communication protocols. As such, the mention of point-to-point and specifically SIP are only examples. In any case, the communication device 104 receives the data objects without requesting the data objects. Thereafter, the method 200 terminates at step 212.

In an embodiment, the communication device 102 sends information describing the data objects to the communication device 104 after receiving the affiliation request. This information is used by the communication device 104 to identify data objects that the communication device 104 requires from communication device 102. In an embodiment, the information that communication device 102 sends to communication device 104 identifies all the data objects that have not been received by communication device 104 as a set. Knowing the set of data objects that the communication device 104 has not received, the communication device 104 can then decide to send a request to the communication device 102 for the data objects that it does not have. In one example, the request indicates to communication device 102 to send only one data object from the data objects to communication device 104. In a second example, even if the communication device 104 is missing only one data object from the set, communication device 104 receives the entire set of data objects. In any case, communication device 102 sends the data objects identified in the set to communication device 104.

In one embodiment, communication device 102 manages records relating to the communication group. In such an embodiment, each record includes at least one of the following: a contact universal resource indicator of a user associated with each communication device in the communication group, an affiliation status of each communication device in the communication group, the data objects that have been sent to each communication device in the communication group, and an acknowledgement message received by each communication device in the communication group.

To maintain information relating to an affiliation status of each communication device in the communication group, in one example, the communication device 102 tracks affiliation-indication messages. Typically, the communication device 102 receives affiliation-indication messages from each communication device associated with the communication group. Each affiliation-indication message indicates which communication device is associated with the communication group. For example, if communication device 102 receives a first affiliation-indication message from communication device 106, then communication device 102 has knowledge that communication device 106 is affiliated with the communication group. In one embodiment, if an affiliation-indication message is not received by communication device 102, then the communication device 102 updates its records to reflect that a communication device is not affiliated. For example, if after a period of time, an affiliation message is not received from communication device 104, then communication device 102 updates its information relating to communication device's 104 affiliation status.

In an embodiment, the communication device 102 manages each communication session by using SIP. In this embodiment, for the communication session between communication device 102 and communication device 104, the user of the communication device 104 sends a REGISTER message to the communication device 102 at periodic intervals on being affiliated with the communication group. The REGISTER message associates the SIP or Session Initiation Protocol Secure (SIPS) Uniform Resource Identifier (URI) with the communication device 104. The current location of a user of the communication device 104 can be provided to the communication device 102 via this REGISTER message. Typically, the user of the communication device 104 can be registered to the communication session through multiple communication devices. For example, a user can send the REGISTER message from a communication device, e.g. a SIP phone, at home or from a communication device, e.g. another SIP phone, at the office. Further, more than one user can be registered from a single communication device. For example, two users, e.g. a night shift employee and a day shift employee, from a single communication device can be registered. A user of the communication device 104 may send a REGISTER message, indicating an expiration interval during which the registration is to be valid. Typically, registrations expire if the registration is not refreshed before the expiration interval is over. However, a user of the communication device 104 can cancel his or her registration within the expiration interval.

To maintain information relating to an affiliation status of each communication device in the communication group, the communication device 102 tracks acknowledgement messages. For example, the communication device 102 receives an acknowledgement message with information that the communication device 106 has received a first data object from the communication device 102. Thereafter, the communication device 102 updates the record corresponding to communication device 106 based on the acknowledgement message received from the communication device 106. The updated record indicates that communication device 106 is affiliated and that it has received a first data object.

To maintain information relating to an affiliation status of each communication device in the communication group, the communication device 102 updates a record when an affiliation-indication message has not been received from a communication device (e.g. 108). In one example, the record is updated after the affiliation-indication message is not received within a predefined time interval. In any case, the updated record indicates that the communication device (e.g. 108) is no longer associated with the communication group.

To maintain information relating to data objects received by each communication device in the communication group, the communication device 102 tracks data objects received by communication devices in response to the communication devices having sent affiliation-indication messages. Further, the communication device 102 also tracks data objects sent to each of the communication devices in the communication group.

Figure 3:
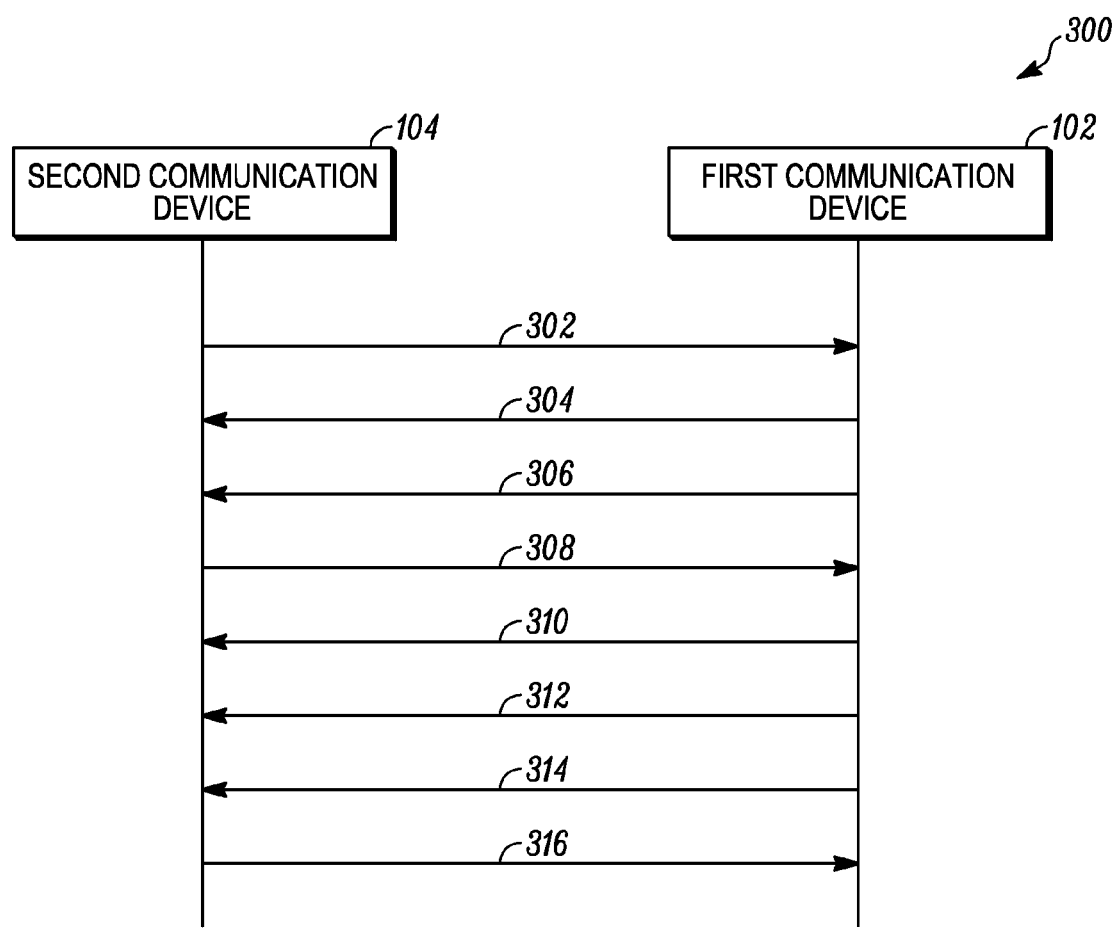
FIG. 3 is a message flow diagram illustrating a method for managing a communication group of communication devices in a communication network, in accordance with an embodiment.

FIG. 3 is a message flow diagram illustrating a specific embodiment for managing the communication group of communication devices in a communication network where the communication devices interact by using SIP. To describe the message flow diagram, reference has been made to FIG. 1, although it should be understood that the message flow diagram can be implemented between any two communication devices in any other suitable environment or network.

To join a communication group, communication device 104 sends an affiliation message to communication device 102, specifically a SIP Affiliate message 302. On receiving the SIP Affiliate message 302, the communication device 102 sends a SIP OK message 304 to the communication device 104. The SIP OK message 304 indicates a successful affiliation of the communication device 104 with the communication group. Thereafter, the communication device 102 sends a SIP Invite message 306 to the communication device 104 to invite the communication device 104 to participate in the communication group. In an embodiment, the communication device 102 initiates a new data session with the communication device 104 after sending the SIP Invite message 306 and sends data objects that have not been received by the user of the communication device 104.

On receiving the SIP Invite message 306, the communication device 104 sends a SIP OK message 308 to the communication device 102. The SIP OK message 308 indicates successfully reception of the SIP Invite message 306 by the communication device 104. Thereafter, the communication device 102 sends a SIP ACK message 310 that indicates that the communication device 102 has received a final response to the SIP Invite message 306 (e.g. via the SIP OK message 308) and that the communication device 104 has become a part of the communication group.

Once a user of the communication device 104 becomes a part of the communication group, the communication device 104 starts receiving data objects sent by other communication devices in the communication group. In an embodiment, the communication device 102 sends data objects in the form of a Real-time Transport Protocol (RTP) Data message 312 to the members of the communication group. As is known to one of ordinary skill in the art, SIP is a component used with other Internet Engineering Task Force (IETF) protocols to build a multimedia architecture. Typically, such an architecture can include RTP protocols for transporting real-time data, such as Real-time Streaming Protocol (RTSP) for controlling delivery of streaming media, Media Gateway Control Protocol (MEGACO) for controlling gateways to a Public Switched Telephone Network (PSTN), and Session Description Protocol (SDP) for describing multimedia sessions, and so forth. As further known, SIP is used in conjunction with other protocols to provide a range of services to users of communication devices. However, as is known, SIP functionality and operation do not depend on any of these protocols.

When the communication device 102 decides to terminate a group communication session of the communication group, it sends a SIP BYE message 314 to communication device 104. Typically, the SIP BYE message 314 can also be sent by a member of the communication group, e.g. communication device 104. On receiving the SIP BYE message 314, communication device 104 sends a SIP OK message 316 to communication device 102. Sending the SIP OK message 316 indicates that the communication device has successfully received and accepted the SIP BYE message 314. Thereafter, the communication between the communication device 102 and the communication device 104 terminates.

Various embodiments of the present invention offer one or more advantages. Embodiments enable caching of data objects, so that the data objects can be re-distributed to the members of the communication group who have not received the data objects. Further, embodiments enable users who have joined the communication group later to receive the data objects that they have not received. Moreover, embodiments ensure the timely delivery of data objects and metadata associated with the data objects to the communication group.

It will be appreciated that embodiments of the present invention, described herein, may comprise one or more conventional processors and unique stored program instructions that control the one or more processors, to implement, in conjunction with certain non-processor circuits, some, most or all of the functions of the system described herein. The non-processor circuits may include, but are not limited to, signal drivers, clock circuits, power-source circuits, and user-input devices. Therefore, these functions may be interpreted as steps. Alternatively, some or all the functions can be implemented by a state machine that has no stored program instructions, or in one or more application-specific integrated circuits (ASICs), in which each function, or some combinations of certain of the functions, are implemented as custom logic. Of course, a combination of the two approaches can also be used. Thus, methods and means for these functions have been described herein.

It is expected that one with ordinary skill, notwithstanding possibly significant effort and many design choices motivated by, for example, available time, current technology and economic considerations, when guided by the concepts and principles disclosed herein, will be readily capable of generating such software instructions, programs and ICs with minimal experimentation.

In the foregoing specification, the invention and its benefits and advantages have been described with reference to specific embodiments. However, one with ordinary skill in the art would appreciate that various modifications and changes can be made without departing from the scope of the present invention, as set forth in the claims. Accordingly, the specification and the figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application, and all equivalents of those claims, as issued.

What is claimed is:

1. A method comprising, at a first communication device:
   receiving one or more data objects addressed to a communication group, the communication group being affiliated with a plurality of communication devices in a communication network;
   sending the one or more data objects to each of the plurality of affiliated communication devices in the communication group via one or more messages addressed to the communication group and recording which users respectively associated with each of the plurality of communication devices in the communication group have received the one or more sent data objects, the data objects comprising one or more of audio, video, and text;
   after the one or more data objects have been sent to the plurality of communication devices in the communication group, receiving an affiliation request to join the communication group from a second communication device;
   affiliating the second communication device to the communication group, and responsively:
      determining, by reference to the recording of which users have received the one or more sent data objects, whether the one or more data objects previously sent to the communication group have already been received by a current user of the second communication device; and
      responsive to determining that the one or more data objects have not already been received by the current user of the second communication device, providing the one or more data objects to the second communication device by establishing a communication session between the second communication device and the first communication device.

2. The method as recited in claim 1, further comprising the second communication device storing the one or more data objects for a first predefined time interval determined by the first or second communication device.

3. The method as recited in claim 1, wherein providing the one or more data objects to the second communication device comprises:
   sending information related to the one or more data objects to the second communication device, wherein the information describes the one or more data objects;
   receiving a request from the second communication device for a subset of the one or more data objects, wherein the subset of the one or more data objects is identified in the request; and
   sending the subset of data objects identified in the request to the second communication device.

4. The method as recited in claim 1, wherein providing the one or more data objects to the second communication device comprises sending the one or more data objects to the second communication device automatically without the second communication device having to request the one or more data objects.

5. The method as recited in claim 1, wherein the communication session between the second communication device and the first communication device is a point-to-point communication session.

6. The method as recited in claim 1, wherein sending the one or more data objects to the plurality of communication devices in the communication group comprises sending the one or more data objects to the second communication device while it is in use by a past user different from the current user.

7. The method as recited in claim 1, further comprising managing records of the communication group, wherein each record comprises: a) a contact universal resource indicator of a user associated with each communication device in the communication group, b) an affiliation status of each communication device in the communication group, c) at least one data object sent to each communication device in the communication group, and d) at least one acknowledgement message received by each communication device in the communication group.

8. A method comprising, at a first communication device:
receiving one or more data objects addressed to a communication group, the communication group being affiliated with a plurality of communication devices in a communication network;
sending the one or more data objects to each of the plurality of affiliated communication devices in the communication group via one or more messages addressed to the communication group and recording which users respectively associated with each of the plurality of communication devices in the communication group have received the one or more sent data objects, the data objects comprising one or more of audio, video, and text;
after the one or more data objects have been sent to the plurality of communication devices in the communication group, receiving an affiliation request from a second communication device for the second communication device to affiliate with the communication group;
affiliating the second communication device to the communication group, and responsively:
determining, by reference to the recording of which users have received the one or more sent data objects, whether the one or more data objects previously sent to the communication group have already been received by a current user of the second communication device;
responsive to determining that the one or more data objects have not already been received by the current user of the second communication device:
establishing a communication session between the second communication device and the first communication device;
sending information related to the one or more data objects to the second communication device, wherein the information describes the one or more data objects;
receiving a request from the second communication device for a subset of the one or more data objects identified by the information; and
sending the subset of the one or more data objects identified in the request to the second communication device.

9. The method as recited in claim 8, wherein the determining further comprises maintaining a list of data objects that are received by the current user of the second communication device.

10. The method as recited in claim 8, further comprising managing records of the communication group to identify a user affiliation status of each communication device in the communication group.

11. The method as recited in claim 10, wherein managing the records of the communication group comprises:
receiving an affiliation-indication message from a third communication device, wherein the affiliation-indication message indicates that the third communication device is affiliated with the communication group; and
updating a record corresponding to the third communication device, wherein the updated record indicates that the third communication device is associated with the communication group.

12. A method comprising, at a first communication device:
receiving one or more data objects sent by a second communication device and addressed to a communication group, the communication group being affiliated with a plurality of communication devices in a communication network;
after the one or more data objects have been sent by the second communication device, sending the one or more data objects to each of the plurality of affiliated communication devices in the communication group via one or more messages addressed to the communication group and recording which users respectively associated with each of the plurality of communication devices in the communication group have received the one or more sent data objects, the data objects comprising one or more of audio, video, and text;
after the one or more data objects have been sent to the plurality of communication devices in the communication group, receiving an affiliation request from a third communication device for the third communication device to affiliate with the communication group;
affiliating the third communication device to the communication group, and responsively:
determining, by reference to the recording of which users have received the one or more sent data objects, whether the one or more data objects previously sent to the communication group have already been received by a current user of the third communication device;
responsive to determining that the one or more data objects have not already been received by the current user of the third communication device:
establishing a point-to-point communication session between the third communication device and the first communication device;
sending the one or more data objects to the third communication device; and
managing a record of the communication group to identify that the current user of the third communication device has received the one or more data objects.

13. The method as recited in claim 12, further comprising storing the one or more data objects for a first predefined time interval, wherein the first predefined time interval is determined by one of a) the first communication device and b) the second communication device.

14. The method as recited in claim 12, wherein managing the record of the communication group comprises:

receiving an acknowledgement message from the third communication device indicating that the third communication device has received the one or more data objects; and updating the record corresponding to the current user of the third communication device based on the received acknowledgement message.

15. The method as recited in claim 8, wherein sending the one or more data objects to the plurality of communication devices in the communication group comprises sending the one or more data objects to the second communication device while it is in use by a past user different from the current user.

16. The method as recited in claim 1, the method further comprising the first communication device:

maintaining a list of which users have received the one or more data objects; and providing the one or more data objects to the second communication device after the affiliation request has been received and after determining, by referencing the list, that the current user of the second communication device has not already received the one or more data objects.

17. The method as recited in claim 1, wherein the first communication device retrieves the one or more data objects from a third communication device, that is a member of the communication group and previously received the one or more data objects sent to the communication group, prior to providing the one or more data objects to the second communication device.

18. The method as recited in claim 8, wherein the first communication device retrieves the subset of one or more data objects from a third communication device, that is a member of the communication group and previously received the one or more data objects sent to the communication group, prior to providing the subset of the one or more data objects to the second communication device.

19. The method as recited in claim 12, wherein the first communication device retrieves the one or more data objects from a fourth communication device, that is a member of the communication group and previously received the one or more data objects sent to the communication group, prior to providing the one or more data objects to the third communication device.

20. The method as recited in claim 12, wherein sending the one or more data objects to the third communication device comprises sending the one or more data objects to the third communication device automatically without the third communication device having to request the one or more data objects.

* * * * *

UNITED STATES PATENT AND TRADEMARK OFFICE
CERTIFICATE OF CORRECTION

| | | |
|---|---|---|
| PATENT NO. | : 8,374,179 B2 | Page 1 of 1 |
| APPLICATION NO. | : 11/690587 | |
| DATED | : February 12, 2013 | |
| INVENTOR(S) | : Thomas et al. | |

It is certified that error appears in the above-identified patent and that said Letters Patent is hereby corrected as shown below:

In the Specification

In Column 6, Line 61, delete "successfully" and insert -- successful --, therefor.

Signed and Sealed this
Fifteenth Day of October, 2013

Teresa Stanek Rea
*Deputy Director of the United States Patent and Trademark Office*